United States Patent
Marshall

(10) Patent No.: US 9,218,528 B1
(45) Date of Patent: Dec. 22, 2015

(54) VIVID: IMAGE-BASED TECHNIQUE FOR VALIDATION/VERIFICATION OF ID STRINGS

(71) Applicant: Roger G Marshall, Plymouth, NH (US)

(72) Inventor: Roger G Marshall, Plymouth, NH (US)

(*) Notice: Subject to any disclaimer, the term of this patent is extended or adjusted under 35 U.S.C. 154(b) by 38 days.

(21) Appl. No.: 14/120,984

(22) Filed: Jul. 21, 2014

(51) Int. Cl.
*G06K 9/00* (2006.01)
*G06T 11/00* (2006.01)
*G06T 7/40* (2006.01)

(52) U.S. Cl.
CPC ............ *G06K 9/00577* (2013.01); *G06T 7/407* (2013.01); *G06T 7/408* (2013.01); *G06T 11/001* (2013.01); *G06K 9/00* (2013.01); *G06T 2207/30176* (2013.01)

(58) Field of Classification Search
CPC ..... G07D 7/0033; G07D 7/00; G06Q 20/108; G06Q 20/405; G06K 9/00288; G06K 2209/01; G06K 9/2018; G06F 21/316; G06F 21/73; G06F 2221/2111; G06F 7/082; H04L 63/0861; H04L 9/3247; A61B 5/02; A61B 5/024; G07F 7/04; G07F 7/082; G07B 2017/00443; A61J 2205/10
USPC ........ 382/115, 135, 137, 138; 705/39, 44, 64, 705/305, 318
See application file for complete search history.

(56) References Cited

U.S. PATENT DOCUMENTS

| | | | | |
|---|---|---|---|---|
| 5,862,260 A * | 1/1999 | Rhoads | ............. | G06F 17/30876 382/232 |
| 6,017,496 A * | 1/2000 | Nova | .................... | B01J 19/0046 422/107 |
| 6,314,406 B1 * | 11/2001 | O'Hagan | ............. | G06K 7/0004 705/14.23 |
| 8,162,125 B1 * | 4/2012 | Csulits | ................ | G07D 7/0033 194/206 |
| 8,433,123 B1 * | 4/2013 | Csulits | .................... | G07F 19/20 209/534 |
| 8,929,640 B1 * | 1/2015 | Mennie | ............. | G06K 9/00469 382/135 |
| 2001/0034717 A1 * | 10/2001 | Whitworth | ........... | G06Q 20/341 705/64 |
| 2005/0033651 A1 * | 2/2005 | Kogan | ............... | G06Q 30/0601 705/26.1 |
| 2007/0179885 A1 * | 8/2007 | Bird | ....................... | G06Q 20/04 705/39 |
| 2011/0111840 A1 * | 5/2011 | Gagner | ................... | G07F 17/32 463/25 |
| 2012/0262560 A1 * | 10/2012 | Nisani | .................... | A61B 1/041 348/68 |
| 2013/0246285 A1 * | 9/2013 | Chayun | ................. | G06Q 10/20 705/305 |
| 2014/0279516 A1 * | 9/2014 | Rellas | ................ | G06Q 30/0185 705/44 |

* cited by examiner

*Primary Examiner* — Vu Le
*Assistant Examiner* — Aklilu Woldemariam

(57) ABSTRACT

A software system which employs a special set of simulated electrical circuits to generate user-specific textured and signature color images based on alphanumeric strings provided by the user. The output of the system is a unique set of textured and solid color images which can be used as validation and verification components in creating secure identification documents, financial documents and credit/debit cards.

15 Claims, 5 Drawing Sheets

Block schematic of the VIVID Software system

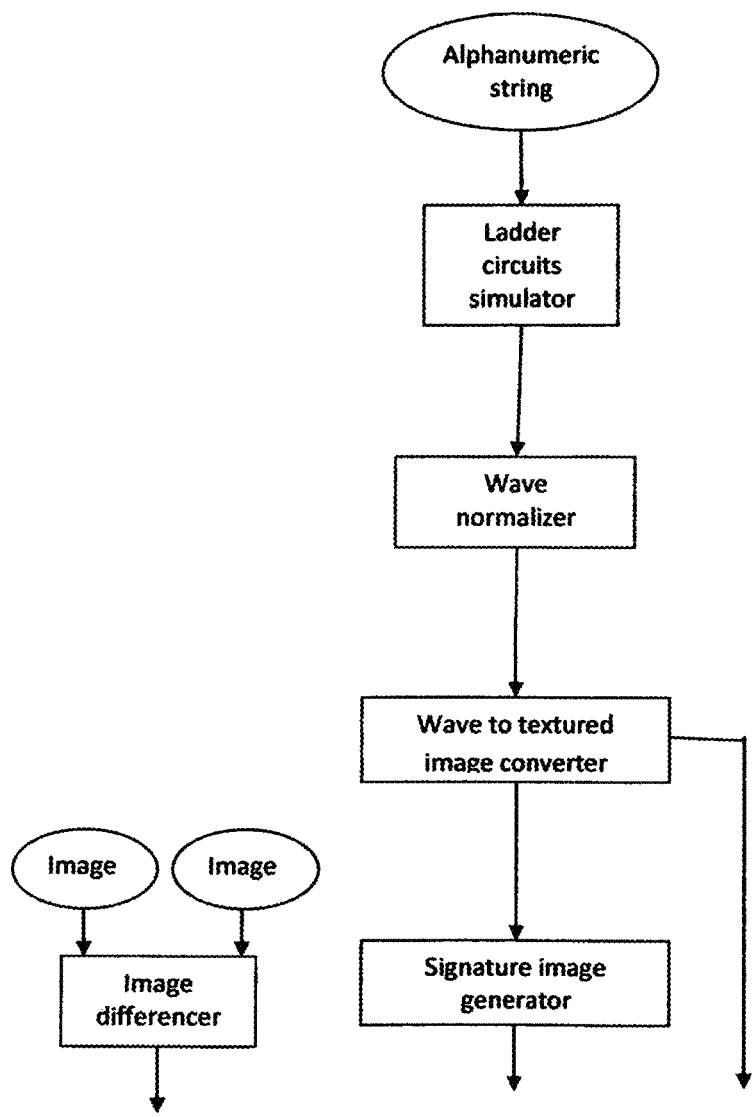
FIGURE 1. Block schematic of the VIVID Software system

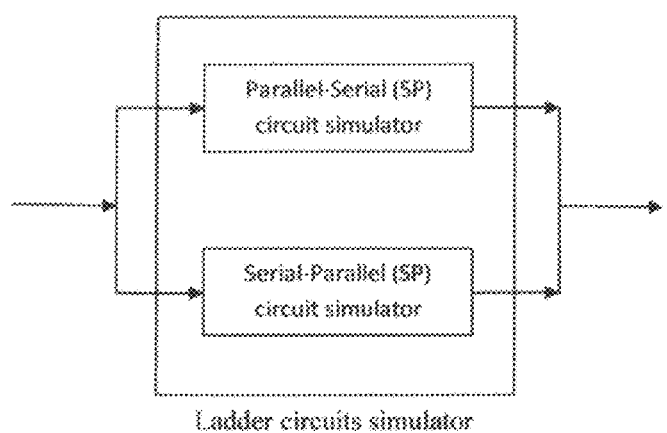

FIGURE 2. Block schematic of the ladder circuits simulator with alphanumeric string as input and wave patterns as output

| Input string | Image type | SP circuit | | PS circuit | |
|---|---|---|---|---|---|
| | | magnitude | phase | magnitude | phase |
| '$55' | texture | | | | |
| | signature | | | | |
| 'JOHN DOE' | texture | | | | |
| | signature | | | | |
| 'DL562513' | texture | | | | |
| | signature | | | | |

FIGURE 3 Images output by the VIVID system for 3 types of input strings – a) numeric, b) alphabetic, c) mixed

| Input string | Image type | SP circuit | | PS circuit | |
|---|---|---|---|---|---|
| | | magnitude | phase | magnitude | phase |
| '123-45-6780' | texture | | | | |
| | signature | | | | |
| '123-45-6789' | texture | | | | |
| | signature | | | | |

FIGURE 4. Images output by the VIVID system for two social security number input strings which differ only in the last digit

| Input string | Image type | SP circuit | | PS circuit | |
|---|---|---|---|---|---|
| | | magnitude | phase | magnitude | phase |
| '$5,378' | texture | | | | |
| | signature | | | | |
| '$53.78' | texture | | | | |
| | signature | | | | |
| '07-16-2014' | texture | | | | |
| | signature | | | | |
| 'July 16, 2014' | texture | | | | |
| | signature | | | | |

FIGURE 5. Images output by the VIVID system for input strings representing dollar amounts and dates [Even though the signature entry appears to be empty, the image is actually white!]

| Input string | Image type | SP circuit | | PS circuit | |
|---|---|---|---|---|---|
| | | magnitude | phase | magnitude | phase |
| 555-55-555 | texture | | | | |
| | signature | | | | |
| 'XXXXX' | texture | | | | |
| | signature | | | | |

FIGURE 6. Images output by the VIVID system for two palindrome input strings; the second string contains the same characters throughout.

| Input strings | Image type | SP circuit | | PS circuit | |
|---|---|---|---|---|---|
| | | magnitude | phase | magnitude | phase |
| 'JOHN A SMITH' and 'JOHN Q SMITH' | texture | | | | |
| | signature | | | | |

FIGURE 7. Difference images output by the VIVID system for input strings which differ in just one position (shown in red and blue)

FIGURE 8. Original document (top) and VIVID artifact (bottom)

VIVID: IMAGE-BASED TECHNIQUE FOR VALIDATION/VERIFICATION OF ID STRINGS

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

CROSS-REFERENCE TO RELATED APPLICATIONS

Does not apply

REFERENCE TO TABLE OR COMPUTER PROGRAM LISTING

The specification is accompanied by one TEXT file containing a computer program listing.

BACKGROUND OF THE INVENTION

In this document we use the term 'ID number' to mean any message string including passwords and login names, card numbers, currency denominations and check amounts (the last two can be specified either in numeric terms or spelled out in text form). Identification numbers (ID) issued by various national and private organizations are typically application specific and follow a prescribed alpha-numeric format. Examples include the 9-digit social security number issued by the US government, the 8 or 11 alphanumeric bank identification code or SWIFT code set up by the International Standards Organization, the 16-digit bank card number issued by American Express, Visa and the like. In a physical setting where a user has to present a valid form of identification artifact such as a passport or a driver's license, the artifact contains an ID number, a name and a photograph. The photograph in the artifact is checked against the physical appearance of the person presenting the artifact. From the standpoint of user verification, this has a significant drawback in that the alphanumeric data on the artifact is totally independent of the photograph attached to the artifact making it easy to substitute one photograph for another. In some scenarios such as cashing checks, to prevent counterfeiting checks are embedded with either a holographic image or a watermark unique to the issuing entity. The artifacts are viewed from different angles to check the presence of a hologram or watermark. This is also deficient since holograms and watermarks are totally unrelated to the alphanumeric data on the checks.

In many physical and online situations, mere knowledge of the appropriate ID numbers is sufficient to gain access to a variety of services. To prevent unauthorized use, organizations have been resorting to a two-step verification process in which additional information needs to be provided by the user. Techniques such as answering user-supplied or system generated security questions, typing in morphed data provided by patented systems such as CAPTCHA. [See U.S. Pat. No. 6,195,698 B1 "Method for selectively restricting access to computer systems"], one-time verification codes sent via email or text messages to cell phones and computers, etc. are now quite standard. What these techniques share in common is the one-dimensional or linear nature of the verification information to be provided by the user.

In some systems, when a user initially sets up an account, in addition to devising a password, the user is also asked to pick one picture from among a set of system (organization) supplied pictures. The chosen picture along with the devised password is used in future transactions between the user and the organization. This online method, while image-based, is quite ad hoc since there is no intrinsic relationship between the user login name, password and picture. The patented QR code system is a two-dimensional system and it operates very much like the one-dimensional bar code system. See U.S. Pat. No. 5,726,435, JP 2938338 and EPO 0672994. The QR code method is a two-way system in that the data encoded into the black and white image can be easily decoded making it vulnerable to tampering. While newer user identification techniques do employ images as in biometric ID systems, even here there is no intrinsic connection between the alphanumeric data/information and the biometric data/information.

The basic issue that needs to be addressed is whether one can devise techniques to ensure or enhance the integrity of critical alphanumeric data on diverse documents in diverse settings, Simple linear representations of text/character data in both computerized and physical settings greatly facilitate the replication and/or alteration of data meant to be secure. Such replications and alterations can be carried out at an individual level or through automated means.

BRIEF SUMMARY OF THE INVENTION

To aid in the validation and verification of ID number-based access to services, a special technique using electrical circuits has been devised for representing the linear ID information in two dimensional format using either highly textured color images or solid color 'signature' images. These images are not drawn from random sources but intrinsically derived from the ID data itself as explained in the 'Detailed Description of the Invention' section of the document. The output images cannot be decoded to obtain the original data from which the images were initially created. Any alteration to the original data, no matter how insignificant, results in an entirely different set of output images. Data validation and verification occur through image comparisons and not through single image decoding.

The VIVID system takes as input an alphanumeric string (name, driver's license number, passport number, bank number, check amount) and generates a unique set of textured color pictures/images and 'signature' (single color) images as output. The alphanumeric input string along with the system generated image set can now be imprinted on a document (passport, ID card, bank check, currency notes, money order, stock certificate, etc.) and used for user verification and validation purposes by the organization issuing the document.

BRIEF DESCRIPTION OF THE SEVERAL VIEWS OF THE DRAWING

The inventor petitions the US Patent Office to permit the usage of color drawings in this patent application since they are absolutely essential to the utility of the invention. Visual discrimination of the differences in software system's output for two or more marginally different inputs is rendered possible only through the employment of various shadings and mixtures of red, blue and green colors; such immediate visual discrimination would not be possible using simple black/white or gray scale images.

LIST OF DRAWINGS

FIG. 1 Block Schematic of the VIVID Software System

FIG. 2 Block schematic of the ladder circuits simulator with alphanumeric string as input and wave patterns as output FIG. 3 Images output by the VIVID system for three types of input strings—a) numeric, b) alphabetic, c) mixed FIG. 4. Images output by the VIVID system for two social security number input strings which differ only in the last digit FIG. 5. Images output by the VIVID system for input strings representing dollar amount s and dates [Even though the signature entry appears to be empty, the image is actually white!]

FIG. 6. Images output by the VIVID system for two palindrome input strings; the second string contains the same characters throughout.

FIG. 7. Difference images output by the VIVID system for input strings which differ in just one position (shown in red and blue)

FIG. 8. Original document (top) and VIVID artifact (bottom)

DETAILED DESCRIPTION OF THE INVENTION

The VIVID system is comprised of eight distinct software functions—a) ladder circuits simulator, b) wave normalizer, c) wave to image converter, g) 'signature' image generator and h) image differencer. The block schematic of the system is depicted in FIG. 1.

Any alphanumeric string serves as input into the ladder circuits simulator which consists of two parts—one part generates a serial-parallel ladder circuit, the other a parallel-serial ladder circuit. The block schematic of the ladder circuits simulator is shown in FIG. 2. Both circuit types are based on a standard set of elementary circuit components consisting of a single resistor (R), a single inductor (L) and a single capacitor (C). Values for the three electrical components are input by the user in response to a system prompt. The R, L and C elements are configured in seventeen distinct ways. In what follows the symbol '+' means a serial connection and '||' a parallel connection. The seventeen circuit configurations are classified as follows: i) single-element circuits [there are 3 of these—just R, just L and just C], ii) two-element circuits where the two elements are connected either serially [there are 3 of these—(R+L), (R+C) and (L+C)] or in parallel (there are 3 of these—(R||L), (R||C) and (L||C)] and iii) three-element circuits [there are 8 of these—R+(L+C), R||(L+C), R+(L||C), R||(L||C), L+(R||C), L||(R+C), C+(R||L) and C||(R+L)]. Each character in the input alphanumeric string is assigned exactly one of the above seventeen circuits. Since there are more than seventeen distinct characters in the ASCII character set, the characters are placed in seventeen different partitions and each partition is assigned a dedicated circuit. The placement of a character into a partition is based on the frequency of occurrence of the character in normal and computer text. If the same character appears more than once in the input string, it is assigned the same circuit assigned to the partition into which the character falls. Note that all characters that belong to the same partition will be assigned the same circuit identified with the partition. This method ensures that no character can be assigned more than one circuit since no character occurs in more than one partition.

If there are 'k' characters in the input alphanumeric string, there will be 'k' circuits not all of which will be distinct. These 'k' individual circuits are combined to create a single overall ladder network. This combining is done in two distinct ways—a) serial-parallel connections of consecutive circuits [SP circuit] and b) parallel-serial connections of consecutive circuits [PS circuit]. The very first character in the input string is assigned the circuit associated with the partition into which the character falls. The processing of subsequent elements in the input string is as follows:

The SP version:

The circuit associated with the second character is connected in series with the first circuit to create a single composite circuit. The circuit associated with the third character is now connected in parallel with this composite circuit to create yet another single composite circuit. The circuit for the fourth character is now connected in series with the composite circuit, the circuit for the fifth character is connected in parallel with the newest composite circuit, and so on—i.e., in strictly alternating fashion [serial-parallel-serial-parallel-serial-etc.].

The PS version:

The circuit associated with the second character is connected in parallel with the first circuit to create a single composite circuit. The circuit associated with the third character is now connected in series with this composite circuit to create yet another single composite circuit. The circuit for the fourth character is now connected in parallel with the composite circuit, the circuit for the fifth character is connected in series with the newest composite circuit, and so on—i.e., once again in strictly alternating fashion [parallel-serial-parallel-serial-parallel-etc.].

The two resulting ladder circuits are structurally different and have different overall impedances. The frequency responses (wave forms) of these circuits are quite different when voltage is applied to them. A simple sine wave voltage is used by the system. The frequency of the sine wave is input by the user in response to a prompt by the system.

The wave normalizer function takes a wave signal as input and produces as output the same signal in normalized form. The normalization is performed by dividing the amplitude of every data point of the signal by the signal spread where signal spread is defined as the absolute value of the difference between the maximum amplitude and the minimum amplitude of the signal. This procedure only affects the signal amplitude and has no impact on the phase.

The wave mixer takes two input waves and combines them into a single wave taking into account both the magnitude and phase of each data point in the input waves. Each data point in the output wave will have its own magnitude and phase values.

The wave to image converter takes the one-dimensional input wave signal and transforms it into two-dimensional form. This is done by interpreting every three consecutive data points of the wave as representing the red, green and blue color values of a single pixel and mapping the set of pixels so obtained into a two-dimensional square structure.

The signature image generator takes as input any digital image and computes the sum of squares of the color value for each of the three colors by examining the color composition of each pixel in the image. The 'signature' color value is defined as the sum of squares value modulo 256. Each pixel in the image is then assigned the signature red value, the signature green value and the signature blue value. This means every pixel in the newly created image will have the same color—this color constitutes the 'signature' of the input image.

The image differencer takes two same-size images as input, computes the difference between corresponding pixels in the two images for all the pixels and outputs the difference image. This functionality is required for data validation and verification purposes.

The entire circuit (both SP and PS versions have been considered) representing an alphanumeric input string has been subject to a current $I(t)=\sin(\omega t)$ where $\omega=2\cdot\pi\cdot$frequency. The frequency value is supplied by the user. The circuit voltage $V=IZ$ is computed for a specific set of time steps. Z represents the overall impedance of the circuit. The set of voltage values at these time steps has been cast into matrix form; the matrix is now taken to represent a set of pixel elements so that the matrix can be converted into an image.

For each set of user provided input data, the VIVID system outputs 4 textured images and 4 signature images. For every texture image, there is a corresponding signature image. Of the four textured images, two are from the SP circuit, the other two from the PS circuit. Consequently, there are four signature images as well, two per circuit version.

The SP and PS circuit representations for a select set of ID strings have been generated to obtain the frequency response of these circuits. The image representations of the circuits' frequency responses, both magnitude and phase, are depicted in FIGS. 3 to 6. In FIG. 3 the images output by the VIVID system for 3 types of input strings—a) numeric, b) alphabetic, c) mixed—are shown. FIG. 4 shows the images output by the VIVID system for two social security number input strings which differ only in the last digit. FIG. 5 shows the images output by the VIVID system for input strings representing dollar amounts and dates. In FIG. 6 the images shown are the VIVID system's output for two palindrome input strings; the second string contains the same characters throughout. The difference images produced by VIVID and shown in FIG. 7 are for two ID strings which differ in just one position (the single character difference is shown in red and blue).

The invention claimed is:

1. A method for generating textured images or solid color images of a magnitude and phase responses of an interconnected set of basic electrical circuits which have been simulated on a computer processor; where each of these basic simulated circuits represents some subset of a standard ASCII alphanumeric character set; where the subsets do not share one or more characters in common; where no basic simulated circuit represents more than one subset of characters; where each basic simulated circuit is comprised of an interconnection of a resistors, inductors and capacitors; where a user specifies as basic input to the processor a) an alphanumeric character string, b) a resistor value greater than zero, c) an inductor value greater than zero, d) a capacitor value greater than zero, e) a frequency value greater than zero; where for pairs of textured images or solid color images, difference images can be generated; where the images generated are of square shape; where the user can specify the size of the square images that are output by the processor; where the processor outputs an artifact consisting of the user-input alphanumeric string shown alongside set of textured or solid color output images generated for that particular alphanumeric string; where the images in the artifact can be used for validation and verification purposes.

2. A method according to claim 1 wherein, given an alphanumeric input string $d_1 d_2 d_3 \ldots d_m$ (m>1) the circuit modeling the $i^{th}$ element (i<=m) in the string is connected to the composite interconnected circuit modeling all the previous (i−1) elements in the input string either in serial or in parallel fashion using an alternating pattern, thereby producing two different circuit implementations.

3. A method according to claim 2 wherein each of the two circuit implementations produces two output waveforms, one representing the magnitude of the voltage output, the other representing the phase of the output voltage.

4. A method according to claim 3 wherein the output waveforms are converted into textured images or solid images.

5. A method according to claim 1 wherein the subset of ASCII character set is restricted to upper and lower case letters of the English alphabet, the digits 0 thru 9, the $ symbol, the period symbol, the comma, and the blank space characters.

6. A method according to claim 5 wherein the characters in the ASCII subset are further subdivided into smaller subsets based on an individual character's frequency of occurrence.

7. A method according to claim 1 wherein the alphanumeric string represents a passport number or social security number or driver's license number.

8. A method according to claim 1 wherein the alphanumeric string represents a financial institution's credit card or debit card number.

9. A method according to claim 1 wherein the alphanumeric string represents a bank's routing number or identification code.

10. A method according to claim 1 wherein the alphanumeric string represents an employee id number of an organization.

11. A method according to claim 1 wherein the alphanumeric string represents the name of an individual.

12. A method according to claim 1 wherein the alphanumeric string represents the date of birth of an individual.

13. A method according to claim 1 wherein the alphanumeric string represents a denominational unit of currency.

14. A method according to claim 1 wherein the alphanumeric string represents the amount on a bank check or money order or bond or stock certificate.

15. A method according to claim 1 wherein the difference images generated can serve to establish the equivalence or non-equivalence of two input alphanumeric strings.

* * * * *